July 30, 1935.  J. H. JAMES  2,009,662
PARTIAL OXIDATION OF HYDROCARBONS
Filed Jan. 25, 1932
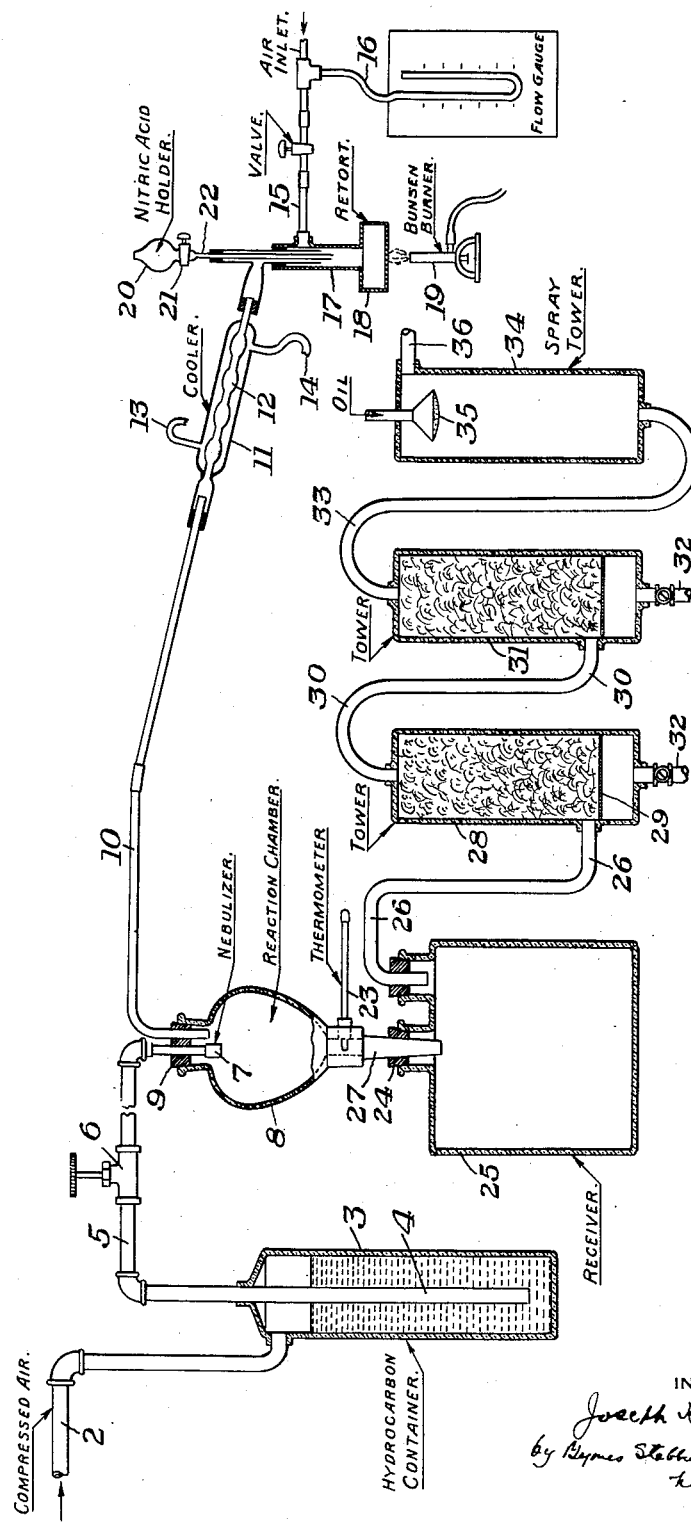
INVENTOR
Joseph Hidy James Patented July 30, 1935

2,009,662

UNITED STATES PATENT OFFICE 2,009,662

PARTIAL OXIDATION OF HYDROCARBONS

Joseph Hidy James, Pittsburgh, Pa., assignor to Clarence P. Byrnes, Sewickley, Pa., trustee Application January 25, 1932, Serial No. 588,544

3 Claims. (Cl. 260—116)

Reference is had to the accompanying drawings, forming part of this specification, in which:

The figure is a diagrammatic elevation showing one form of apparatus for carrying out my invention.

In the partial oxidation of hydrocarbons in the vapor or gas phase wherein the hydrocarbon is mixed with an oxygen-containing gas, such as air, and is passed through a hot reaction zone, preferably in the presence of a catalyst such, for example, as set forth in my Patent No. 1,697,653, dated January 1, 1929, the temperature of reaction in forming oxygen derivatives of the hydrocarbons, while lower than that of continuous self-sustained complete combustion, has been within a range in which the product is deleteriously affected. This is due mainly to two reactions which occur at such temperatures; namely, dehydrogenation which results in the formation of ill smelling unsaturated compounds, and thermal decomposition or incidental cracking which results in forming many compounds or bodies by the thermal decomposition of the hydrocarbon or the oxidized bodies, or both. These reactions which occur at such temperatures greatly increase the complexity of the resulting condensate, cause an objectionable odor and also affect the color.

My invention is designed to overcome these difficulties as well as to cheapen and simplify the process. I have discovered that when a gaseous chemical compound containing oxygen, such for example as the oxides of nitrogen, is employed, hydrocarbons in vapor or gas phase or in the form of a fog or mist may be partially oxidized at a low temperature relative to that used in former commercial partial oxidation processes in the gaseous or vapor phase. Incidental reactions such as thermal decomposition and dehydrogenation may thus be avoided.

In the preferred form, the liquid hydrocarbons are brought into a finely divided condition, such as a fine mist or fog, as for example by means of an atomizer or nebulizer, and then mixed with a gas containing free oxygen, such as air, and with a finely divided chemical containing chemically combined oxygen such as oxides of nitrogen or other oxide in fluid form; and passed through one or more reaction chambers; and then the condensable portion of the exit gas is condensed. The desired reactions under these conditions will take place at a temperature materially below 250° C. and also below 200° C., as well as below 150° C.; and the process is preferably carried out on normally liquid hydrocarbons at a temperature below 100° C. The desired reactions will take place under such conditions at or near room temperature. This is a remarkable fact in this art, especially as regards aliphatic hydrocarbons which are notably inert and sluggish toward such reactions.

In carrying out the preferred form of my process, I prefer to saturate the liquid hydrocarbon with air or an oxygen-containing gas prior to passing it through the nebulizer or atomizer, by subjecting it to air under pressure, which air may also serve to force it to the atomizing apparatus. This air pressure may extend up to four hundred pounds or more on the reservoir side of the oil supply system, and the dissolved or occluded air which tends to saturate the liquid hydrocarbon aids in breaking up the oil as it emerges from the nebulizing apparatus to a greater degree than where the oil is pumped directly by liquid pressure to the nebulizer or atomizer.

I prefer to form the oxides of nitrogen by thermal decomposition of nitric acid in an auxiliary decomposer from which the nitric oxides pass to the reaction chamber or to the air stream passing thereto. Where a gas containing free oxygen is used, the oxides of nitrogen are preferably mixed with such air or oxygen-containing gas before introduction to the reaction chamber, although the mixing may occur in the reaction chamber itself.

I have discovered that by the above procedure, I can partially oxidize various petroleum fractions at temperatures under 200°–250° C., and even under 100° C. and at or near room temperatures, the degree of oxidation in passage through the chamber being usually less than that obtained by the first attack on the same hydrocarbon mixture by my former method using a solid catalyst and an elevated temperature above 200°–250° C., but below that of continuous self-sustained complete combustion.

To increase the yield, I preferably use a series of oxidizers carrying out the same reaction in successive steps on the same batch or mixture. However, additional oxygen-containing gas, such as air, and if desired, additional oxides of nitrogen may be supplied between any of the successive oxidizers following the first; and fresh hydrocarbon mixture in nebulized or atomized form or in vapor or gas phase may also be additionally supplied between successive reaction chambers in such case. Condensation may be effected between any or all such successive reactions, or only after the last reaction.

Since a large amount of the organic compounds, including oxygen derivatives of hydrocarbons, emerge from the reaction chamber in the form of a fog or mist, I preferably cause coalescence thereof to form a liquid, as for example by passing the exit stream through a considerable thickness of finely meshed material or through glass wool or some foraminous or cellular material.

In the drawing showing one form of apparatus for carrying out my invention: 2 represents a compressed air pipe leading to the upper part of a closed liquid hydrocarbon container 3 from the lower part of which a pipe 4 leads the oil fraction saturated with air through pipe 5, having control valve 6, to a nebulizer or atomizer 7, projecting into the reaction chamber 8, which is preferably of glass or fused quartz or fused silica, so that the action of the atomizer or nebulizer may be observed. In my tests, the nebulizer used was a Schutte-Koerting atomizer or nebulizer with a spiral groove to set up a spiral movement of the entering hydrocarbon. In proper operation, this mixture issues from the atomizer in the form of a fine spray or mist. The nebulizer tube is shown as extending through a stopper 9, through which also extends a pipe 10, leading from a cooling device 11, through the inner tube 12 of which passes a mixture of nitrogen oxides. 13 and 14 are the usual inlet and outlet pipes for cooling water around the inner tube. Air enters through a valved pipe 15, having flow gauge 16; and this air enters the neck portion 17 of a retort 18, heated by Bunsen burner or burners 19. 20 is a glass receptacle containing nitric acid having a glass stem and cock 21, leading to supply tube 22, by which the nitric acid is dropped into the retort in which it is thermally decomposed and flashes into oxides of nitrogen as it strikes the hot bottom of the retort. The entering air picks up these oxide vapors and carries them on with it to the reaction chamber.

The bottom outlet 27 of the reaction chamber contains a thermometer 23 and projects down through a closure 24 of a receiver 25, in which at least a part of the exit mixture is condensed on the cool walls. From this condensing receiver, a pipe 26 may lead to a double-surface condenser system or a scrubber system in which the stream is exposed directly to the cooling liquid in the scrubbers, or to both.

In carrying out the process with this apparatus, measured portions of the air-saturated hydrocarbon are forced to the nebulizer and enter the reaction chamber 8 in the form of a fine mist, fog or spray. At the same time, air containing the oxides of nitrogen is fed in through pipe 10, both these feeds being preferably in carefully measured amounts or volumes. In the presence of the gaseous oxides, oxygen is tied into the hydrocarbon molecules and oxygen derivatives of hydrocarbon thus formed. The vapor, mist or finely divided mixture passes out through exit pipe 27 into the receiver 25, and thence preferably to a further condensing tower or system, and thence to scrubbers arranged in series.

The nitrogen oxides formed are probably $NO_2$ and $N_2O_3$. When used with air, these oxides probably function in the oxidation reaction by giving up oxygen to the hydrocarbons and immediately becoming reoxidized by the oxygen of the air present. The saturation of the hydrocarbon with air previous to reaching the nebulizer or atomizer aids in breaking the oils into a finely divided condition, the degree of atomization being greater than where the oil is pumped direct by liquid pressure to the nebulizer or atomizer.

The reaction may be carried out at a temperature materially below 250° C., below 200° C. and preferably below 100° C. and near a room temperature. The cooler for cooling the entering oxides may or may not be used as desired. No heating of the mixture or any part thereof is necessary, although preheating of the oil, oxygen-containing gas, oxides or metal salts may be used prior to forming the mixture.

In order to obtain a liquid pool of condensate, I preferably employ fine-meshed or porous or foraminous material to which the exit gas is subjected to coalesce the particles.

In the drawing, I have shown the suction pipe 26 as leading from the receiver 25 to the lower portion of a tower 28, just above a screen support 29, above which is a deep layer of glass wool or other cellular or foraminous material. From the top of this tower a pipe 30 leads to the corresponding portion of a similar tower 31. From the bottoms of the towers lead valved offtake pipes 32 for liquid, and from the top of tower 31, a pipe 33 leads to the bottom of a spray tower 34 having a top spray device 35, through which a heavy oil is preferably showered to aid in collecting the condensed products. From this tower, a pipe 36 may lead off to water scrubbers, if desired, and thence to a suction device.

I will now describe some test runs which I have made in the use of the process.

*Run No. 1.*—The oil used was "furnace oil", a heavy Pennsylvania kerosene fed at the rate of 12 liters per hour. The air pressure on this oil was about 75 pounds per square inch. The air was fed at the rate of about 2.5 liters per minute through the reaction vessel and the nitric acid decomposed during the run was about 2.5% of the volume of oil fed. The temperature of the reaction vessel was about 50° to 60° C. The condensed oxidized oil showed about 4% by volume of organic acids and aldehydes about 2% by volume.

*Run No. 2.*—The oil used was "Pennsylvania gas oil" fed at the rate of 6 liters per hour. Air pressure on the oil, 75 pounds per square inch. Air fed at the rate of about 2.5 liters per minute through the reaction globe. Nitric acid decomposed about 2.5 cc. per minute (about 2½% by volume of the oil fed). Copper nitrate formed in the copper retort was carried over mechanically in visible amounts in the stream of air and oxides or nitrogen to the reaction vessel. The temperature was about 40 to 50° C. The oxidized product collecting in receiver 25 showed acid by volume about 17% and aldehydes by volume in the non-saponified portion about 4%.

*Run No. 3.*—Here the conditions were the same as in the second run, except that an iron retort was used for decomposing nitric acid. Hence, there were no copper compounds carried over into the reaction chamber. With the same feeds and conditions as run No. 2, the condensate in the receiver 25 showed organic acids by volume 9% and aldehydes in the non-saponifiable portion about 2% by volume.

*Run No. 4.*—Here a gasoline formed by cracking West Virginia petroleum fractions was used and fed at the rate of .93 liter per hour. Air pressure on the gasoline was about 300 pounds per square inch. The nitric acid decomposed was about 2.5% by volume of the oil fed. The temperature was about 35° to 38° C. The air fed through the reaction globe was about 20 liters per minute. The oxidized oil recovered showed about 12% by volume of acids and about 4% by volume of aldehydes in the non-saponifiable portion. The solubility in 70% ethyl alcohol was about 60%.

In all runs, the nitric acid was fed gradually and dropped into the retort, the oxides of hydrogen formed being mixed with the air and passed into the reaction chamber. The cooler was used in run No. 3 and no cooler was used in runs Nos. 1, 2 and 4.

None of the products had the peculiar odor characteristic of products made by my vapor phase catalytic process; and at the temperatures used, there was, of course, no thermal decomposition of the raw material and substantially no dehydrogenation to produce unsaturated compounds.

The raw material preferably consists of a petroleum oil fraction or fractions which may be cracked or not prior to the partial oxidation step. The preliminary cracking often used may be carried out either at atmospheric pressure or at superatmospheric pressure in the liquid vapor or mixed phase. High or low pressures may be used in cracking with high or low temperatures. The process may also be applied to oxygen derivatives of hydrocarbons to further oxidize them. It may also be applied to cyclic and aromatic types of hydrocarbons or to mixed types and to terpenes. Suction may be used to draw the exit gas through the condensing system and the operation may be carried out either at substantially atmospheric pressure or at any desired superatmospheric pressure. In the latter case, if an oxygen-containing gas, such as air, is used, the free oxygen present will be intensified and a stronger action obtained. In such case, the various feeds must, of course, be under superatmospheric pressure, which may be adjusted as desired by suitable reducing valves.

The temperature of the reaction vessel or chamber is preferably kept above the dew point which would cause collection of liquid film on the interior of its walls. The amount of air fed is preferably such that free oxygen is present in the exit gas, although this may be varied as desired. The volume of oxygen may be above or below the theoretical amount for formation of the desired compounds or any of them, that is, above or below the volume which theory would demand for forming the products desired.

Cooling of the oxides of nitrogen or of the air containing them may be used or not as desired. The reaction zone may have cooling means or not as desired. For example, it may have a surrounding counterflow system for heat interchange or it may be surrounded by cooling jackets in which either liquid or gaseous fluids are used. The raw material used may be widely varied and the operation may be repeated on the same mixture or the mixture supplied with further air, oxides of nitrogen, or further raw material in finely divided form between any and all of the successive reaction chambers; and in such case, the exit stream from each chamber may be condensed or partially condensed or not as desired, previous to passing to the reaction chamber. If a closed superatmospheric system is used with successive passages of the mixture through the same by one or more additional reaction chambers, a bleed-off is preferably employed in the system, to provide constant conditions; and in such case, a pump may be employed for keeping up the circulation.

I am aware of the United States patent to Bailey, No. 1,319,748 of October 28, 1919, using oxides of nitrogen and air in oxidizing methane at a temperature of about 450° C. or a red heat and also the Bibb reissue patent, reissued March 11, 1924, as No. 15,789, which also used oxides of nitrogen for oxidizing methane or natural gas at a temperature of from 250° to 560° C., and preferably about 500° C., but such processes used a much higher temperature than that of my process. I am also aware of the Von Unruh Patent No. 891,753, where it was proposed to oxidize methane at a temperature of 30° to 50° C. by the catalyzing action of bark. All broader claims to the subject matter disclosed herein are present in my copending application, Ser. No. 627,178, filed August 1, 1932, the claims herein being limited to features not disclosed therein.

The oxides of nitrogen may be added in a relatively small proportion to the volume of oil treated, in connection with an oxygen-containing gas, such as air. However, within my broader claims, the oxides of nitrogen may be added in much larger proportion as an "oxidant"; and in sufficient amounts so that the transfer of oxygen derived from these oxides will be sufficient to carry out the partial oxidation reaction. Here again, the temperature would preferably be within the ranges above recited. Other finely divided materials containing combined oxygen may be used than oxides of nitrogen, to supply the oxygen in such cases for chemical reaction with the finely divided oil.

Many changes may be made in the apparatus used, the temperature of reaction may be varied below 200–250° C., and other changes may be made without departing from my invention.

I claim:

1. In the partial oxidation of hydrocarbons, the steps consisting of feeding under pressure a gas containing free oxygen to a body of liquid hydrocarbon, bringing the hydrocarbon into a finely divided condition, then mixing it with oxides of nitrogen and further gas containing free oxygen, and passing the same into a reaction chamber.

2. In the partial oxidation of hydrocarbons, the steps consisting of decomposing nitric acid into oxides of nitrogen, forming a mixture of said oxides of nitrogen with a gas containing free oxygen and with finely divided liquid hydrocarbon, and passing the mixture through a reaction zone at a temperature materially below 250° C.

3. In the partial oxidation of hydrocarbons, the steps consisting of feeding a gas containing free oxygen in measured amounts, feeding oxides of nitrogen in gaseous or vapor phase, mixing the same with measured amounts of finely divided liquid hydrocarbon, and passing the same into a reaction zone at a temperature below 200° C.

JOSEPH HIDY JAMES.